United States Patent [19]

Takada

[11] Patent Number: 4,811,912
[45] Date of Patent: Mar. 14, 1989

[54] EMERGENCY LOCKING SEAT BELT RETRACTOR WITH AUTOMATIC LOCKING MECHANISM

[76] Inventor: Juichiro Takada, 12-1, 3 chome, Shinmachi, Setagayaku, Tokyo, Japan

[21] Appl. No.: 169,373

[22] Filed: Mar. 17, 1988

[30] Foreign Application Priority Data

Mar. 18, 1987 [JP] Japan .................................. 62-038528

[51] Int. Cl.$^4$ ........................ B60R 22/38; B60R 22/40
[52] U.S. Cl. ........................ 242/107.4 B; 242/107.4 R
[58] Field of Search ................. 242/107.4 R, 107.4 B, 242/107.4 A, 107.4 D; 280/806; 297/478

[56] References Cited

U.S. PATENT DOCUMENTS

| 4,436,255 | 3/1984 | Matsui et al. | 242/107.4 A |
|---|---|---|---|
| 4,564,154 | 1/1986 | Takada | 242/107.4 B |
| 4,565,338 | 1/1986 | Takada | 242/107.4 B |
| 4,597,546 | 7/1986 | Yamamoto | 242/107.4 R X |
| 4,726,539 | 2/1988 | Schmidt et al. | 242/107.4 A |
| 4,747,562 | 5/1988 | Tsukamoto et al. | 242/107.4 A X |

Primary Examiner—John M. Jillions
Attorney, Agent, or Firm—Brumbaugh, Graves, Donohue & Raymond

[57] ABSTRACT

A seat belt retractor having an emergency locking mechanism that includes a lock ring coupled by a pin and slot to a locking pawl comprises an automatic locking mechanism activated by rotation of the belt reel upon unwinding of a predetermined length of the belt from the reel for causing the locking pawl automatically to engage the ratchet wheel regardless of the rate of acceleration of the belt reel and thereby lock the reel against rotation in the unwinding direction and deactivated in response to rotation of the reel upon rewinding of a predetermined length of the belt onto the reel. The automatic locking mechanism includes an automatic actuator pawl mounted on the lock ring to pivot between an automatic locking position in engagement with the ratchet wheel and a non-locking position out of engagement with the ratchet wheel, an activating lever having an arm engageable with the actuator pawl, an over-center spring coupled to the activating lever and biassing it to a first position in which the arm moves the actuator pawl to the automatic locking position and also biassing it to a second position out of engagement with the actuator pawl, and a planetary gear train responsive to rotation of the belt reel for pivoting the activating lever between the first and second positions at predetermined points in the rotation of the reel.

2 Claims, 8 Drawing Sheets

EMERGENCY LOCKING SEAT BELT RETRACTOR WITH AUTOMATIC LOCKING MECHANISM

FIELD OF THE INVENTION

The present invention relates to vehicle safety seat belt retractors and, in particular, to an emergency locking type retractor having a mechanism that changes the locking mode from emergency locking to automatic locking.

BACKGROUND OF THE INVENTION

A well-known and widely used type of vehicle safety seat belt retractor, the emergency locking type, allows the belt to be unwound except when the vehicle is abruptly decelerated or accelerated, such as occurs in a collision. Numerous mechanisms that detect the rate of change in vehicle speed (positive or negative acceleration) by an inertia detecting device and lock the belt reel when the acceleration exceeds a preset level are known in the prior art. Such mechanisms may respond directly to acceleration of the vehicle in any direction, e.g., in mechanisms that use pendulums, tilting weights or rolling or sliding masses, or to rapid acceleration of the belt reel, e.g., mechanisms that include an inertia wheel that normally rotates with the belt reel but lags behind the reel due to rapid unwinding (rotary acceleration) of the belt. Emergency locking retractors are popular because they allow the user to change position or loosen the belt for comfort at will.

The ability of the belt to unwind from an emergency locking retractor against the relatively small force of the winding spring, which force is kept small so that the belt is not pulled uncomfortably tightly against the wearer, presents a problem when a conventional emergency locking retractor is used to secure child safety seat to the vehicle seat. The problem is that the safety seat can move forward or sideways due to braking, turning or other normal maneuvers and motions of the vehicle. Moreover, a collision is often preceded by a sharp turn or hard braking that is intended to avert the collision or that itself results in a collision (e.g., loss of control or a skid). The child safety seat may move in these situations, with the result that it is not tightly held on the vehicle seat and can, along with its occupant, be thrown about when a collision occurs.

The above-described problem is well known and various solutions have been proposed, among them manual locking devices which require the user to push a button or move a lever to change the mode of operation of the reel locking mechanism from emergency to automatic.

Matsui U.S. Pat. No. 4,436,255 (Mar. 13, 1984) describes and illustrates a seat belt retractor that automatically changes back and forth between an emergency-locking mode and an automatic-locking mode in accordance with the winding and unwinding of the belt, the conversion being caused by a cam wheel that rotates through a small fraction of a revolution for each revolution of the belt reel. The cam wheel moves a spring between positions holding a locking pawl in engagement with a locking ratchet wheel of the retractor and a position out of engagement with the ratchet wheel, the latter position establishing the emergency locking configuration of the retractor. The spring continually engages the cam wheel and is subject to friction and wear whenever the belt is being wound onto or unwound from the reel.

The present inventor proposed in Takada U.S. Pat. No. 4,565,338 (Jan. 21, 1986) a retractor having a mechanism for activating an automatic locking mode in response to withdrawing nearly all of the belt from the belt reel. The retractor of that patent includes a pivotable actuator engageable with a reel-locking pawl in the locked and unlocked conditions through a lost motion coupling, an over-center spring associated with the retractor for biassing it toward the respective engagements and a reduction mechanism driven by the reel and having an output member having two circumferentially spaced-apart lugs for moving the actuator between its two positions. The design of that retractor is such that the automatic locking mechanism is activated only after nearly all of the belt is unwound from the reel; the lug that activates automatic locking cannot be rotated in the belt-unwinding direction past the position where activation occurs, lest in rewinding that same lug will deactivate the automatic locking mechanism. This means that activation occurs only after a length of the belt greater than that required to hold the child safety seat has been withdrawn. Therefore, if the user pulls enough of the belt out to fasten the safety seat in place but not enough to activate the automatic locking mode, the safety seat will not be properly secured to the vehicle seat.

Yamamoto et al. U.S. Pat. No. 4,597,546 (July 1, 1986) has a mechanism similar to that of Takada U.S. Pat. No. 4,565,338 (discussed immediately above) and presents the same problem.

SUMMARY OF THE INVENTION

There is provided, according to the present invention, an improvement in a seat belt retractor of a known type having a belt reel rotatably mounted in a frame and biassed by a winding spring to rotate in one direction to wind the belt onto the reel, a ratchet wheel coupled to the reel for rotation therewith, a locking pawl supported on the frame for movement between a locking position in engagement with a tooth of the ratchet wheel so as to prevent rotation of the reel in the belt-unwinding direction and an unlocking position clear of the path of the ratchet wheel and an emergency locking mechanism responsive to rotational acceleration of the belt reel in the belt-unwinding direction above a selected level for moving the locking pawl to the locking position and to a selected amount of rewinding of the belt at the urging of the winding spring for automatically urging the locking pawl resiliently to the unlocking position. The emergency locking mechanism operates through a lock ring coupled by a pin and a cam slot to the locking pawl. An automatic locking device activated by rotation of the belt reel upon unwinding of a predetermined length of the belt from the reel causes the locking pawl to automatically engage the ratchet wheel regardless of the rate of acceleration of the belt reel and thereby lock the reel against rotation in the unwinding direction. The automatic locking device is deactivated in response to rotation of the reel upon rewinding of a predetermined length of the belt onto the reel.

The present invention is characterized in that the automatic locking device comprises an automatic actuator pawl mounted on the lock ring to pivot between an automatic locking position in engagement with the ratchet wheel and a non-locking position out of engagement with the ratchet wheel, an activating lever having an arm engageable with the actuator pawl, an overcenter spring coupled to the activating lever and biassing it to a first position in which the arm moves the actuator pawl to the automatic locking position and also biassing it to a second position out of engagement with the actuator pawl, and a mechanism responsive to rotation of the belt reel for pivoting the activating lever between the first and second positions at predetermined points in the rotation of the reel.

In a preferred embodiment, the present invention is further characterized in that the mechanism responsive to rotation of the belt reel includes a planetary gear train having a sun gear rotatable with the belt reel, an internal gear affixed to the retractor frame and a planet gear engaging the sun gear and internal gear, rotating between them and orbiting the sun gear, a projection on the planet gear and a pair of pins engageable by the projection on the planet gear in predetermined rotational and orbital positions thereof and upon such engagements movable to engage and shift the activating lever between the first and second positions.

For a better understanding of the invention reference may be made to the following description of an exemplary embodiment, taken in conjunction with the accompanying drawings.

DESCRIPTION OF THE DRAWINGS

FIG. 6 is a side cross-sectional view of the embodiment; an.

DESCRIPTION OF THE EMBODIMENT

Apart from the automatic locking feature, which is incorporated into the embodiment according to the present invention, the retractor shown in the drawings is similar to that described and shown in the present inventor's prior U.S. Pat. Nos. 4,564,154 (Jan. 14, 1986) and 4,565,338 (Jan. 21, 1986). Reference may be made to those patents for background information helpful in gaining an understanding of the structure and operation of the emergency locking mechanism of the present embodiment.

The embodiment comprises (referring to FIG. 1) a U-shaped frame 1 having side walls 1A and 1B with holes 1a and 1b that receive a reel shaft 2 mounted within bushings 3 (only one of which is shown) and supporting a belt reel 4. One end of the seat belt (not shown) is fastened to the shaft. The belt is wound onto the reel 4 under the rotational force applied to the reel by a winding spring 5 that is attached between the shaft and the frame and is enclosed within a cover 6.

Affixed to the shaft 2 immediately adjacent the outer face of the frame side wall 1B is a ratchet wheel 11.

Upon engagement of a tooth of the ratchet wheel 11 by a locking pawl 20 pivotably attached to the side wall 1B by a pin 21, the reel is locked against rotating in the belt-unwinding direction. Normally the pawl 20 is held in clearance from the ratchet wheel 11 by a lock ring 13 that is fitted to a shaft extension 2a. The shaft extension 2a is freely rotatable within the lock ring 13. The lock ring 13 is coupled to the pawl 20 by a pin 20A on the pawl that is accepted in a cam slot 13E in a flange portion of the lock ring (see FIG. 2). A spring 7 hooked between an anchor hole 13B in the lock ring and in anchor hole 12a in a tie plate 12 and biasses the lock ring clockwise (arrow A2 in FIG. 1), which in turn biasses the pawl counterclockwise (arrow C2 in FIG. 1) to a retracted position (see FIG. 5) away from the ratchet wheel 11 so that the belt can be freely unwound from the reel 4. The pawl 20 is moved clockwise (arrow C1 in FIG. 1) to engage a tooth of the ratchet ring and lock the belt reel against rotation in the belt-unwinding directing upon the activation of an emergency locking mechanism 10 associated with the lock ring 13.

The lock ring 13 has a circular row of internal teeth 13A, any one of which is engageable by a hook 16A on a hook ring 16. The hook ring 16 is pivotably mounted by reception of a hole 16C of a pin 15A on a hook carrier 15 that is affixed to the shaft portion 2a for rotation with the shaft. A compression spring 17 (inertia spring) installed between abutments on the carrier 15 and the ring 16 biasses the ring counterclockwise (arrow B1 in FIG. 1) relative to the carrier about the pin 15A, thereby normally keeping the hook 16A in clearance from the teeth 13A on the lock ring.

Figure 3:
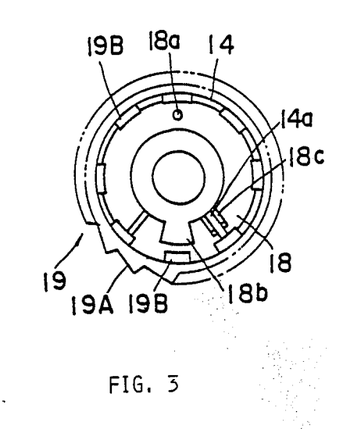
FIG. 3 is an end elevational view of the inertia wheel of the embodiment.
Figure 4:
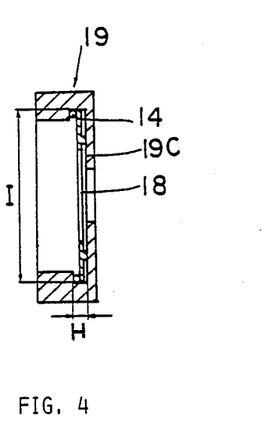
FIG. 4 is a side cross-sectional view of the inertia wheel.

An inertia wheel assembly is coupled to the hook ring 16 by reception of a pin 16B on the hook ring in a hole 18a in a friction coupling member 18, which is a component of the inertia wheel assembly. As shown in FIGS. 3 and 4, the coupling member 18 bears against a wall 19C of an inertia wheel 19 and is held in place by a spring 14, the projecting lugs along the circumference of the member 18 being captured by the spring 14 which, in turn, is held in place by a series of lugs 19B that extend inwardly from the peripheral flange of the inertia wheel 19. The dimensions "H" (FIG. 4) is slightly greater than the combined thicknesses of the member 18 and the spring 14. One end 14A of the spring 14 is hooked into an anchor groove 18C on the inertia wheel 18, and the other end is free of attachment. The spring is biassed to press outwardly against the flange of the inertia wheel and produce frictional coupling between the friction coupling member 18 and the inertia wheel 19. This construction of the inertia wheel assembly is provided in order to reduce the need for high precision in the manufacturing tolerances of the emergency locking mechanism, in that the inertia wheel 19 can rotate relative to the friction coupling ring 18 by overcoming the frictional force of the spring 14 and thereby provide correct timing between the ratchet teeth 19A on the outer surface of the inertia wheel 19 and the teeth 13A on the lock ring 13. As described below, an inertia sensor device (34) works in conjunction with the teeth 19A on inertia wheel 19 to lock the belt reel. The frictional coupling of the inertia wheel to the inertia coupling member also limits the forces acting between the ratchet teeth 19A and the pawl (34B) of the inertia sensing device.

When the belt is unwound with a force that accelerates the reel at a rate less than a predetermined value, the inertia wheel assembly (14, 18 and 19) rotates conjointly with the reel shaft and the hook carrier; the inertia spring 17 biasses the inertia wheel assembly against the inertia forces. When the acceleration of the reel exceeds the predetermined level, the inertia forces acting on the assembly cause it to lag in rotation behind the reel shaft and the hook carrier 15, thereby overcoming the force of the inertia spring 17 and causing the hook ring to pivot clockwise (arrow B2, FIG. 1). The hook 16A engages one of the teeth 13A on the lock ring 13, whereupon the counterclockwise rotation of the hook retainer is applied to the lock ring by the hook ring 16. The rotation of the lock ring pivots the locking pawl 20 clockwise (arrow C1, FIG. 1) by the camming action of the cam slot 13E on the pin 20A and engages it with a tooth of the ratchet wheel 11, thereby stopping the belt reel from rotating in the belt-unwinding direction.

When the force on the belt reel in the unwinding direction ceases, the spring 7 rotates the lock ring 13 clockwise, reversing the camming action of the slot 13E and rotating the pawl 20 counterclockwise (arrow C2, FIG. 1) out of the engagement with the ratchet wheel 11.

As mentioned above, the retractor has an inertia responsive device 34 (See FIG. 5) of the type in which an inertia mass 34A responds to its own inertia when the vehicle (specifically the retractor) is accelerated (negatively or positively) by moving and pivoting a pawl 34B into engagement with one of the ratchet teeth on the inertia wheel 19. Such engagement stops the inertia assembly from rotating with the reel shaft and causes the reel to be locked in the same way as an inertial retardation (lagging) of the inertia assembly does. If the timing of the engagement of the pawl 34B does not match that of the engagement of the hook 16A that of the engagement of the hook with a tooth 13A on the lock ring, the friction coupling member 18 will rotate slightly by overcoming the friction engagement built into the assembly, thereby allowing the hook 16A to engage the lock ring properly.

As described thus far, the embodiment is essentially known from Takada U.S. Pat. No. 4,564,154, which is mentioned above. In accordance with the present invention the embodiment includes a mechanism for converting the retractor from emergency-locking to automatic locking in that the belt reel 4 is automatically locked from rotating in the belt-unwinding direction whenever the belt is pulled out slightly such as to cause a few degrees of rotation of the belt reel.

Figure 1:
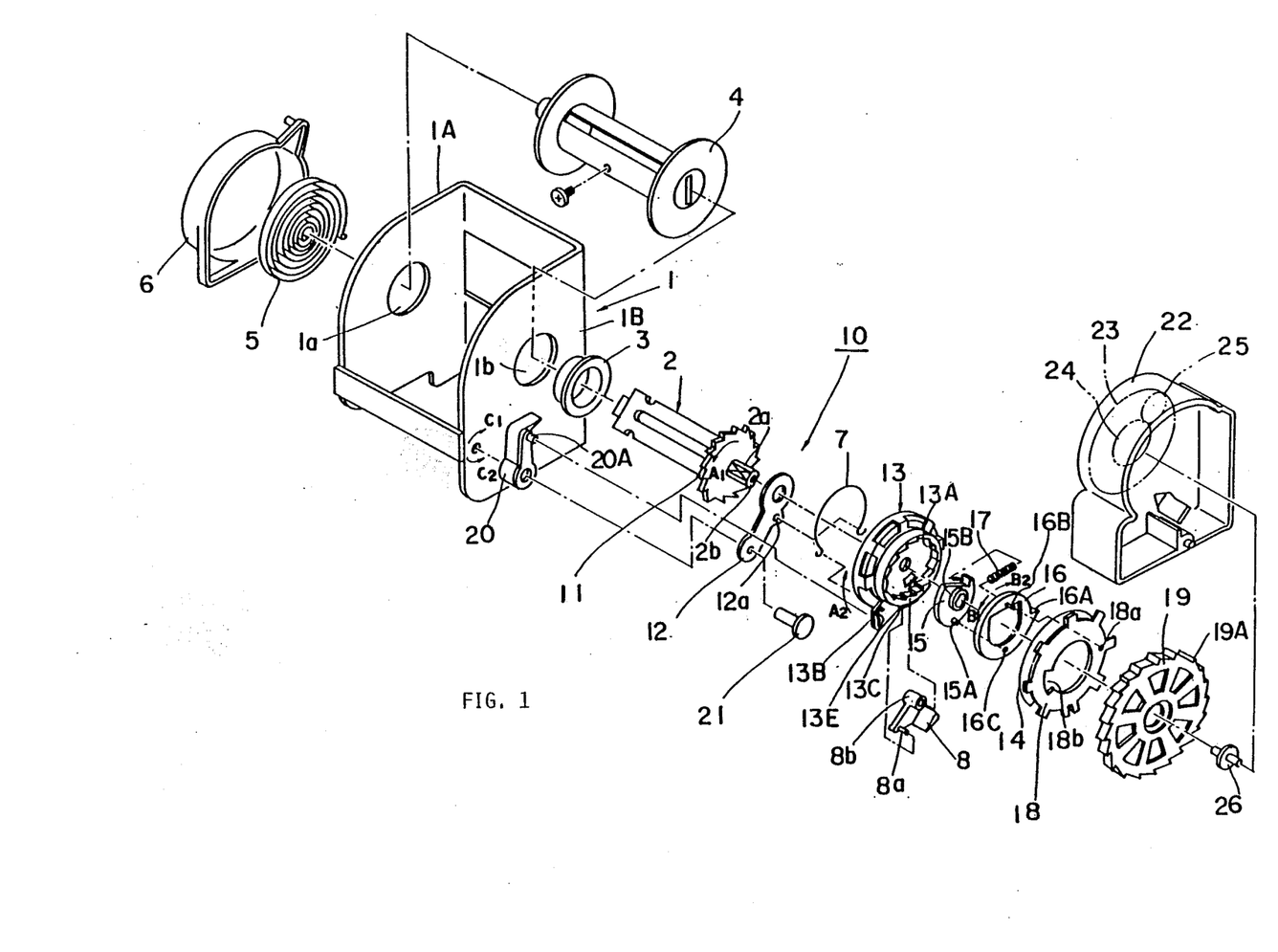
FIG. 1 is an exploded pictorial view of the embodiment, except that some of the components are not shown.
Figure 2:
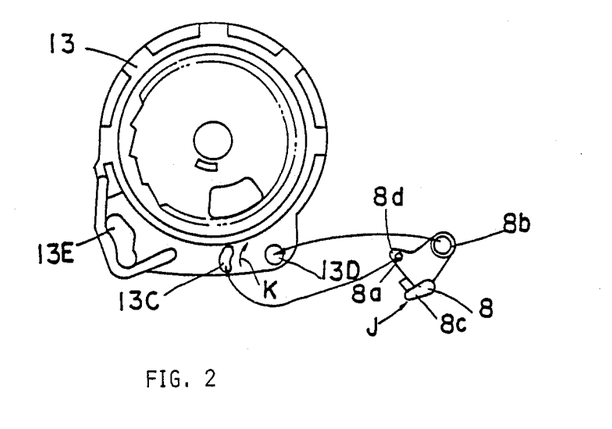
FIG. 2 is an exploded end elevational view of the lock ring and automatic actuator pawl of the embodiment.

Referring to FIGS. 1 and 2, an automatic actuator pawl 8 is pivotably mounted on the side of the lock ring 13 that faces the side wall 1B of the frame 1 by reception of a pin 13D on the lock ring in a hole 8b in the pawl. The amount of pivoting of the pawl about the pin 13D is limited by an arcuate hole 13C in the lock ring and a pin 8a on the pawl that is received in the hole 13C. When the pawl 8 is pivoted clockwise (arrow K in FIG. 2) in the manner described below, the tip 8d of the pawl engages a tooth of the ratchet wheel 11. In its counterclockwise-most position the pawl 8 is clear of the path of the ratchet wheel 11.

Figure 6:
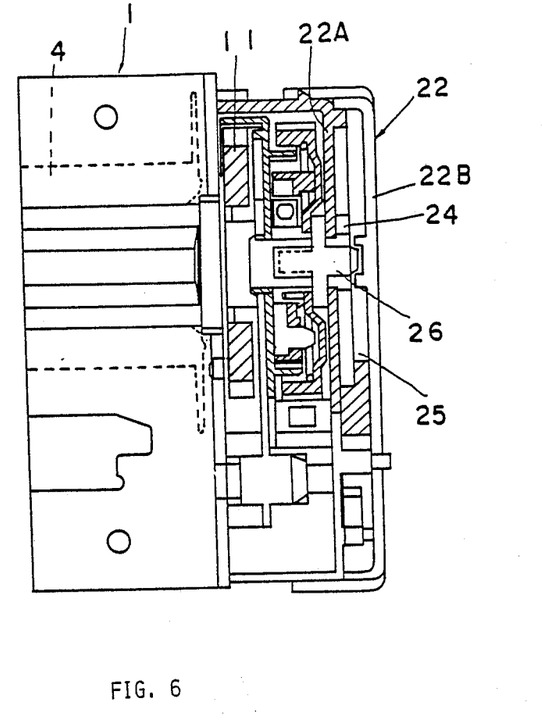

The belt reel locking mechanism is enclosed by a cover 22 that is suitably fastened to the frame side wall 1B. The cover, which is preferably made in two parts (see FIG. 6), includes an end wall 22B and a partition wall 22A. A circular flange on the partition wall has internal gear teeth that constitute an internal gear 23 of a planetary gear train. A retainer 26 received with a force fit in a hole 26 in the end of the shaft portion 2a carries non-rotatably a sun gear 24. A planetary gear 25 meshes with the sun gear and internal gear and both rotates about its own axis and orbits about the sun gear as the latter rotates with the reel shaft.

An activating lever 30 (see FIG. 5) is mounted in the case for pivotal movement about an axis $O_1$. One lug of an over-center spring 33 is attached to an arm 32A of the activating lever 30 at a point $O_3$. The other lug of the spring is coupled to a stationary point $O_2$ provided by a pin or the like in the cover 22. The position of the activating lever 30 is controlled by the planetary gear train, which acts upon two pins 27A and 27B that are slideably received in guideways 28 and 29 in the cover 22. At two specific, predetermined rotational and orbital positions of the planet gear 25, a projection 25A (which is, of course, offset laterally from the gear teeth) engages one or the other of the pins 27A and 27B.

Figure 5:
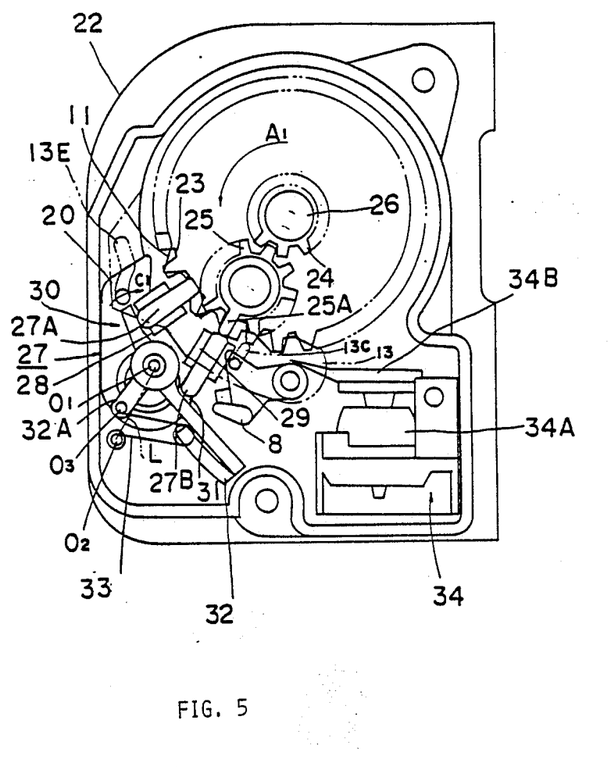
FIG. 5 is an end elevational view of the embodiment.

FIG. 5 shows the configuration of the belt reel locking mechanism when the belt is partially unwound from the reel. It will become apparent from the full description to follow that after the automatic locking mechanism has been activated for use and the belt is rewound after such activation, the projection 25A on the planet gear 25 engages the pin 27B, which in turn engages a surface 31 on the activating lever 30 and pivots the lever 30 to the position shown in FIG. 5. In that position an arm 32 of the lever 30 is clear of engagement with a projecting follower shoe portion 8C (see FIGS. 2 and 5) of the automatic actuator pawl 8. The over-center spring holds the lever 30 in the position shown in FIG. 5 at all times other than when the belt is pulled out far enough to activate the automatic locking mechanism, as described below. It will be understood that the planet gear 25 will orbit to all positions around the sun gear through several complete revolutions of the sun gear without the projection 25A engaging either of the pins 27A and 27B and that FIG. 5 shows the single position in the timing of the gear train where deactivation of the automatic locking mechanism occurs. This position is generally of the order of 80% of full-unwinding of the belt.

Figure 7A:
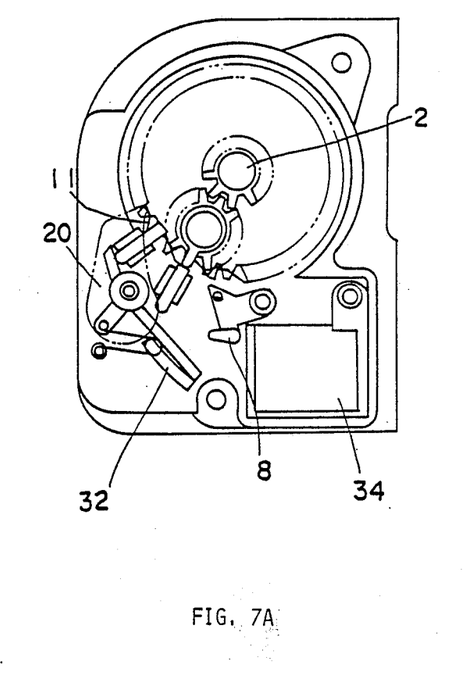
FIGS. 7A to 7D are end elevational views of the embodiment, except that some of the components are not shown in the interest of greater clarity, showing the mechanism in various stages of operation.
Figure 7B:
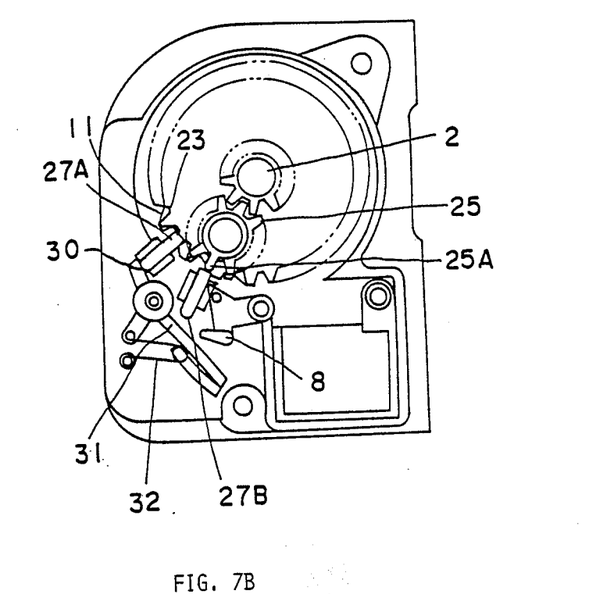

When the automatic locking mechanism is deactivated, the emergency locking mechanism is fully operational at all times. In FIG. 5 the lock ring is shown in the clockwise-most position it assumes under the biassing force of the spring 7, in which the cam slot 13E holds the locking pawl 20 retracted clear of the ratchet wheel. Upon activation of the emergency locking mechanism, in the manner described above, the lock ring rotates counterclockwise to the position shown in FIG. 7A. The automatic actuator pawl 8 rotates with the lock ring but remains inactive, i.e., in clearance from the ratchet wheel 11, inasmuch as the arm 32 of the activating lever continues to retain the inactive position shown in FIG. 5. When the emergency locking mechanism is released and the belt rewinds slightly, the position shown in FIGS. 5 and 7B is restored.

Figure 7C:
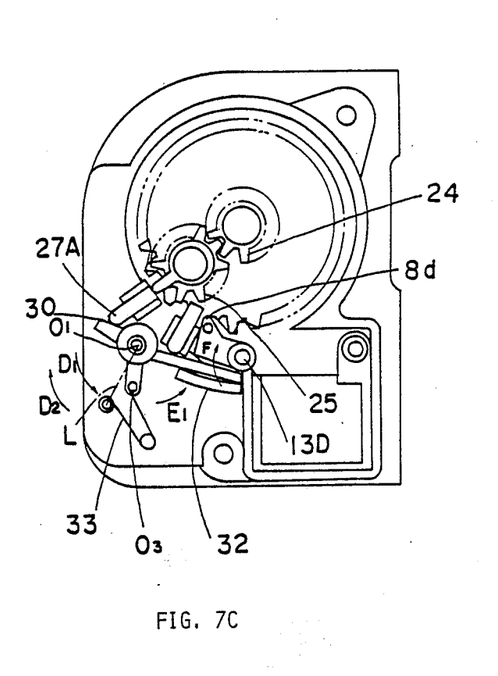

When the belt is unwound from the reel to a predetermined amount somewhat greater than that required for use by a vehicle occupant in order to fasten a child safety seat in place on the vehicle seat, the automatic locking mechanism attains the activated configuration, as shown in FIG. 7C. The amount of belt unwound when this configuration is attained may be, say, 90% of fully unwound. The timing of the planetary gear train is such that the projection 25A of the planet gear engages the pin 27A and pushes it outwardly. The pin 27A engages an arm of the activating lever 30 and pushes the lever counterclockwise (arrows D1 and E1 of FIG. 7C). The arm 32 of the lever is thereupon rotated (arrow F) into engagement with the shoe of the automatic actuator pawl 8, thereby engaging the tip 8d of the pawl with a tooth of the ratchet wheel 11. The bias of the over-center spring on the lever 30 is transferred to counter-clockwise, inasmuch as the point $O_3$ is moved across the line L between points $O_1$ and $O_2$ The automatic locking mechanism is now activated and will remain so until the belt is undone and rewound on the reel enough to reach the state shown in FIG. 5, as described above.

After the belt has been fitted to the child safety seat and buckled up, there will probably be slack in it. The slack is taken up by belt-winding rotation of the reel by the winding spring 5. The over-center spring 33 yields to allow the ratchet wheel 11 to ratchet backwards past the pawl 8. Meanwhile the lock ring 13 holds the locking pawl 20 in the release position clear of the ratchet wheel 11, a condition that obtains at all times except when the belt is pulled out slightly from the retractor.

Figure 7D:
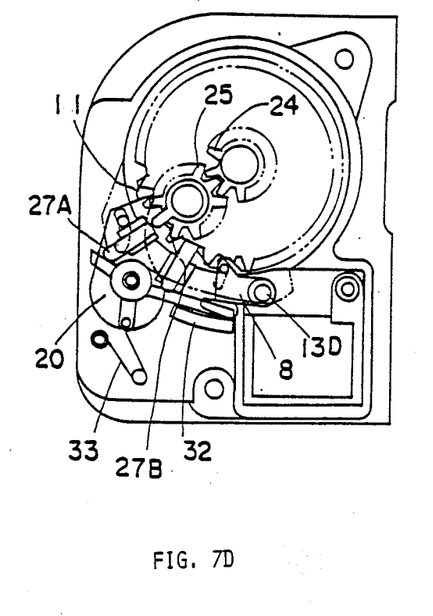

Upon slight withdrawal of the belt counter-clockwise rotation of the reel causes the ratchet wheel 11 to rotate the lock ring 13. The over-center spring 30 keeps the automatic actuator pawl 8 engaged with the ratchet wheel 11 at all times when the automatic locking mechanism is activated. Rotation of the ratchet wheel is, accordingly, transmitted by the pawl 8 to the lock ring 13. Rotation of the lock ring, in turn, produces locking of the locking pawl 20 with the ratchet wheel 11 by the action of the cam slot 13E on the pawl pin 20a, thereby locking the belt reel against rotation in the belt-unwinding direction. FIG. 7D shows the configuration of the mechanism at the state when the reel is locked by the action of the automatic locking mechanism. Automatic locking occurs in the manner described above, regardless of the state of the emergency locking mechanism. Thus, any force on the belt sufficient to cause slight rotation of the reel will produce automatic locking.

When the belt is unbuckled and allowed to rewind onto the reel, the automatic locking mechanism will be deactivated when the configuration shown in FIG. 5 is attained.

I claim:

1. A seat belt retractor having a belt reel rotatably mounted in a frame and biassed by a winding spring to rotate in one direction to wind the belt onto the reel, a ratchet wheel coupled to the reel for rotation therewith, a locking pawl supported on the frame for movement between a locking position in engagement with a tooth of the ratchet wheel so as to prevent rotation of the reel in the belt-unwinding direction and an unlocking position clear of the path of the ratchet wheel, means responsive to rotational acceleration of the belt reel in the belt-unwinding direction above a selected level for moving the locking pawl to the locking position and to a selected amount of rewinding of the belt at the urging of the winding spring for automatically urging the locking pawl resiliently to the unlocking position, said acceleration responsive means including a lock ring coupled by a pin and a cam slot to the locking pawl, and automatic locking means activated by rotation of the belt reel upon unwinding of a predetermined length of the belt from the reel for causing the locking pawl to automatically engage the ratchet wheel regardless of the rate of acceleration of the belt reel and thereby lock the reel against rotation in the unwinding direction and deactivated in response to rotation of the reel upon rewinding of a predetermined length of the belt onto the reel, characterized in that the automatic locking means comprises an automatic actuator pawl mounted on the lock ring to pivot between an automatic locking position in engagement with the ratchet wheel and a non-locking position out of engagement with the ratchet wheel, an activating lever having an arm engageable with the actuator pawl, an over-center spring coupled to the activating lever and biassing it to a first position in which the arm moves the actuator pawl to the automatic locking position and also biassing it to a second position out of engagement with the actuator pawl, and means responsive to rotation of the belt reel for pivoting the activating lever between the first and second positions.

2. A seat belt retractor according to claim 1 and further characterized in that said means responsive to rotation of the belt reel includes a planetary gear train having a sun gear rotatable with the belt reel, an internal gear affixed to the retractor frame and a planet gear engaging the sun gear and internal gear, rotating between them and orbiting the sun gear, a projection on the planet gear and a pair of pins engageable by the projection on the planet gear in predetermined rotational and orbital positions thereof and upon such engagements movable to engage and shift the activating lever between the first and second positions.

* * * * *

UNITED STATES PATENT AND TRADEMARK OFFICE
Certificate

Patent No. 4,811,912                                                                 Patented: March 14, 1989

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Yoshiichi Fujimura.

Signed and Sealed this Ninth Day of November, 1999.

DONALD P. WALSH
*Supervisory Patent Examiner*
Art Unit 3653

(12) REEXAMINATION CERTIFICATE (4677th)
United States Patent
Takada (10) Number: US 4,811,912 C1
(45) Certificate Issued: Dec. 10, 2002

(54) EMERGENCY LOCKING SEAT BELT RETRACTOR WITH AUTOMATIC LOCKING MECHANISM

(75) Inventor: Juichiro Takada, Tokyo (JP)

(73) Assignee: Takata Corporation, Tokyo (JP)

Reexamination Request:
No. 90/006,259, Apr. 3, 2002

Reexamination Certificate for:
| Patent No.: | 4,811,912 |
|---|---|
| Issued: | Mar. 14, 1989 |
| Appl. No.: | 07/169,373 |
| Filed: | Mar. 17, 1988 |

Certificate of Correction issued Nov. 9, 1999. 07/169,373

(30) Foreign Application Priority Data

Mar. 18, 1987 (JP) .............................. 62-038528

(51) Int. Cl.[7] .......................... B60R 22/38; B60R 22/40
(52) U.S. Cl. ................. 242/382.2; 242/383.4; 242/382.4
(58) Field of Search ........................... 242/382.2, 383.4, 242/382.4; 280/806; 297/478

(56) References Cited

FOREIGN PATENT DOCUMENTS

JP           60-151749        10/1985

*Primary Examiner*—Michael R Mansen (57) ABSTRACT

A seat belt retractor having an emergency locking mechanism that includes a lock ring coupled by a pin and slot to a locking pawl comprises an automatic locking mechanism activated by rotation of the belt reel upon unwinding of a predetermined length of the belt from the reel for causing the locking pawl automatically to engage the ratchet wheel regardless of the rate of acceleration of the belt reel and thereby lock the reel against rotation in the unwinding direction and deactivated in response to rotation of the reel upon rewinding of a predetermind length of the belt onto the reel. The automatic locking mechanism includes an automatic actuator pawl mounted on the lock ring to pivot between an automatic locking position in engagement with the ratchet wheel and a non-locking position out of engagement with the ratchet wheel, an activating lever having an arm engageable with the actuator pawl, an over-center spring coupled to the activating lever and biassing it to a first position in which the arm moves the actuator pawl to the automatic locking position and also biassing it to a second position out of engagement with the actuator pawl, and a planetary gear train responsive to rotation of the belt reel for pivoting the activating lever between the first and second positions at predetermined points in the rotation of the reel.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

\* \* \* \* \*